Oct. 1, 1968                 H. BIEHL                3,403,824
APPARATUS FOR PREPARING AND DISTRIBUTING A FORAGE
PULP FOR FEEDING LIVESTOCK
Filed May 6, 1964                6 Sheets-Sheet 1
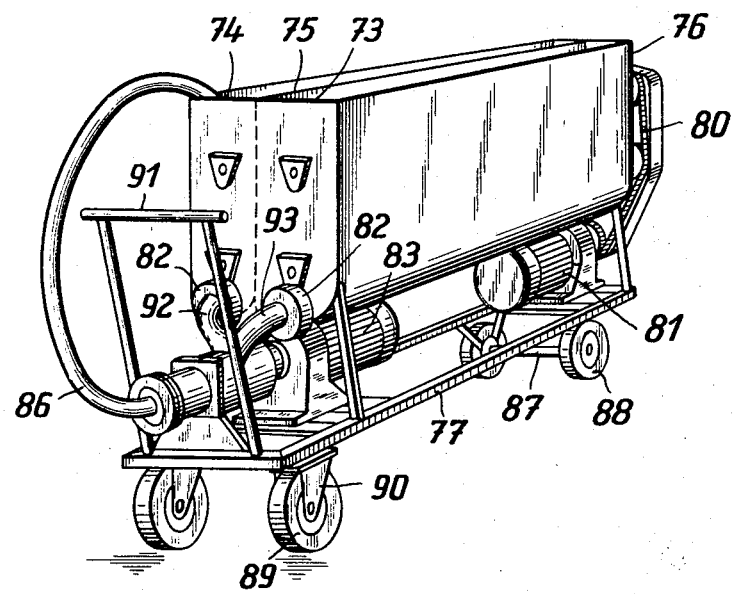
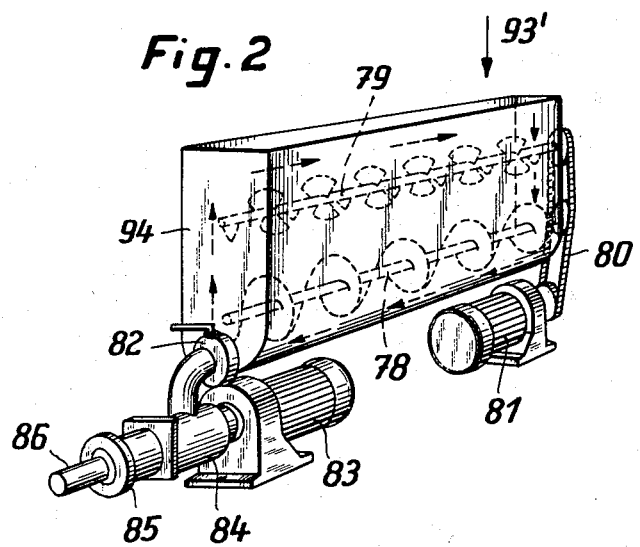
INVENTOR.
Heinrich Biehl
BY
Beaman & Beaman
attys

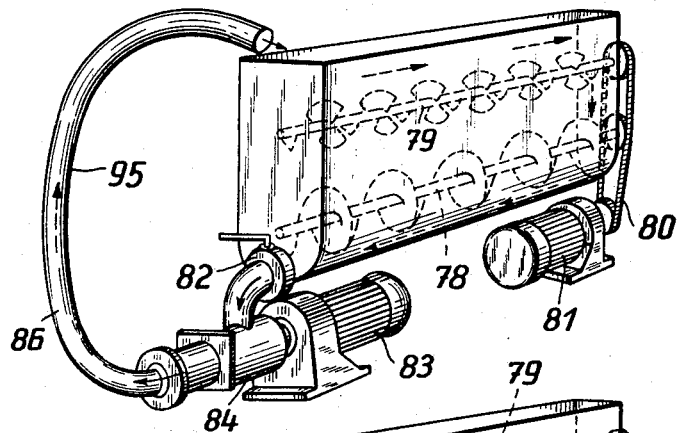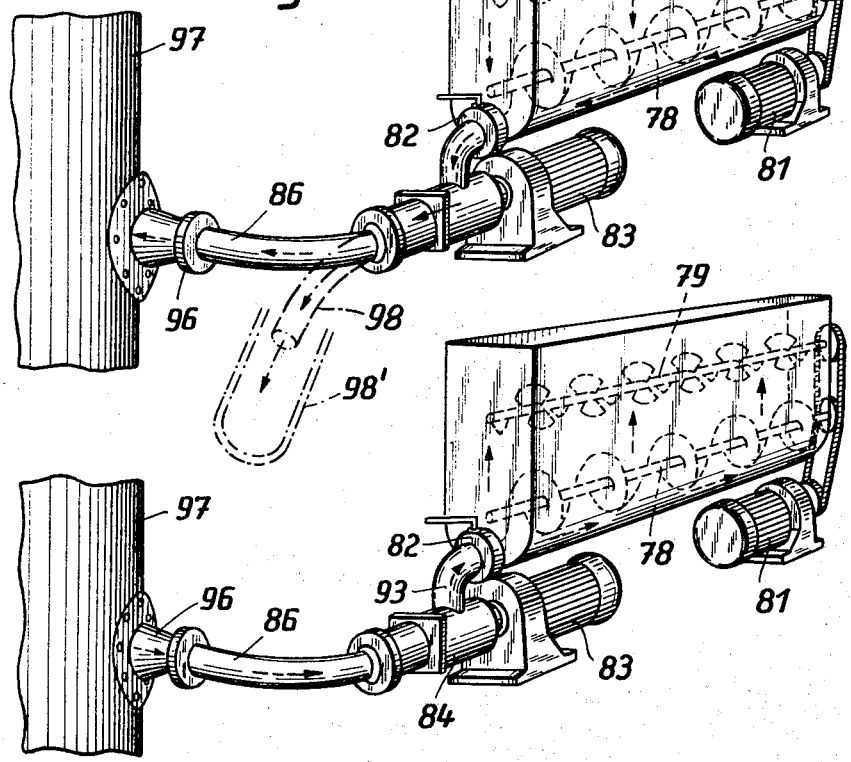

Oct. 1, 1968  H. BIEHL  3,403,824
APPARATUS FOR PREPARING AND DISTRIBUTING A FORAGE
PULP FOR FEEDING LIVESTOCK
Filed May 6, 1964  6 Sheets-Sheet 3

INVENTOR.
Heinrich Biehl
BY
Beaman & Beaman
atty

United States Patent Office 3,403,824
Patented Oct. 1, 1968

3,403,824
APPARATUS FOR PREPARING AND DISTRIBUTING A FORAGE PULP FOR FEEDING LIVESTOCK
Heinrich Biehl, Gut Heinrichshof, near Trittau, Germany
Filed May 6, 1964, Ser. No. 365,312
Claims priority, application Germany, Sept. 6, 1963,
B 73,404
8 Claims. (Cl. 222—176)

ABSTRACT OF THE DISCLOSURE

The invention pertains to apparatus for receiving, mixing and distributing forage pulp for the feeding of livestock wherein the forage is pumped into and from the apparatus by a pump mounted upon a movable reservoir for the pulp. The reservoir contains mixing and distributing means for the pulp, and a number of compartments may be defined in the reservoir to permit various types of forage to be simultaneously transported and selectively dispensed.

---

Figure 6:
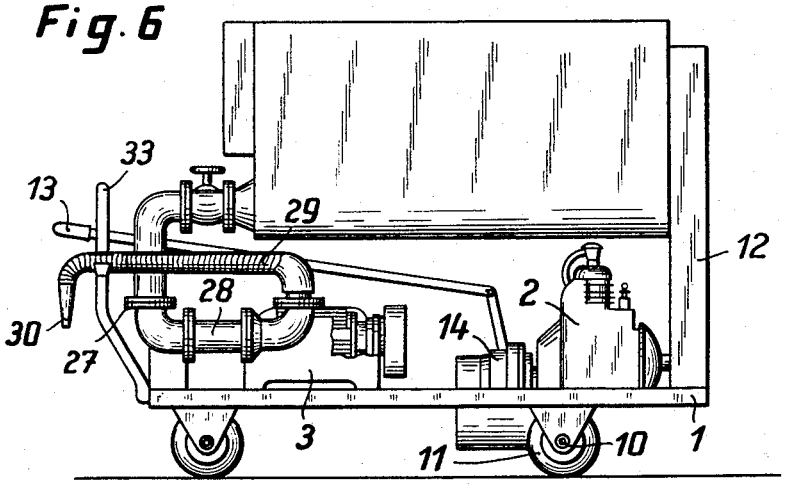

The keeping of domestic animals plays an extremely important part in farms both in Germany and other countries. In the Federal Republic of Germany, $15.7 billions of the total sum of $20.4 billions in sales in the year 1961/1962 are covered by the animal sector.

About 70 to 80% of the expenses to be incurred by the farms engaged in cattle breeding are due to forage costs. The correct composition of the forage and the issue thereof in the appropriate amounts is therefore of greatest importance for the producer of animal products.

In the course of time, the knowledge concerning the composition of the forage has considerably improved. Consequently, it is possible today to carry out animal production with less forage costs in comparison with the past.

What still causes considerable difficulties to the farmer is the issue of certain amounts of forage. But principally, the result of the feeding is dependent much more on the correct measuring of an amount than on the quality of the forage. Although it is possible to weigh each amount in containers before feeding it, one cannot expect that the feeding of animals can be rationalized with the aid of weighing scales and a bucket because of the shortage of labour and the special requirements that must be met by such a worker. In addition, consideration will have to be given to the fact that the issue of rations in the above described manner will bring about considerable handling losses. Farms that are carrying out a rationed feeding with the aid of buckets and weighing scales are as a rule expecting handling losses between 2 and 4%.

The invention is directed to the problem of enabling the farmer to carry out the following items in a simple manner:

(1) Measure certain amounts of food and issue them;
(2) Save work that had to be expended in the usual feeding process to mix the dry forage with water in the trough, and
(3) Uniformly distribute the forage in the trough without having to do any additional work.

In my U.S. Patent 3,172,764, a process to ensilage turnips, turnip leaves, potatoes and grass has been claimed. The special advance of the fermented forage made in this manner from a forage rich in juice results from the fact that the mixture which has been made of the fodder rich in juice and the strong forage mixture before the fermentation, may be used in the feeding process as a sole forage (one-pot forage) after the fermentation has been completed.

United States patent application 296,091, filed July 18, 1963, now abandoned, concerns a process for the production of an ensilaged forage from comminuted albumen forage and comminuted dry forage (especially barley, maize, oats). In accordance with this patent application, it has been found that also ready-mixed forage mixtures with high concentrations of nourishing substances and a low water content may be fermented to advantage. In order to prepare such a fermented forage, the ready-for-use forage which is to be worked-up must be mixed with water before fermentation. In general the admixture of water will have to be kept to limits such that in the end product a content of dry masses of about 45–55% will be obtained.

The processes of the above two disclosures result in a mixture of strong forage which may be used in the feeding process as a sole forage or one-pot forage.

In accordance with the invention, a homogeneous strong forage is made with the aid of a motor driven mixer mounted on a mobile vehicle and provided with a liquid-tight mixing container from comminuted albumen forage and water or of comminuted juicy forage (turnips, turnip leaves, potatoes, grass) instead of the dry forage and water, which is then charged into a stationary silo container by means of a motor driven conveying device arranged in the vehicle, whereupon, on completion of the fermentation in the silo container, the readily ensilaged forage pulp which may be used as a sole forage is charged into the container of the mixer of the same or a similar vehicle and then this vehicle is driven to the stable and the ensilaged forage pulp is issued to the individual troughs to be supplied in metered amounts by means of the conveying device arranged on the vehicle.

In modern farms the feeding of pigs in the case of pure corn fattening, has generally been carried out in such a manner that the ready forage is stored in silos. In such a case, the feeding of the pigs is carried out in such a manner that the forage is taken from the silo, weighed in a bucket and then transported to the piggery; deposited before the trough; then emptied into the trough and mixed with water there. This work repeats thrice a day so that in the course of one year the same operation will be required about a thousand times.

By the invention, this work is substantially reduced. The fermentation period in the silo is about 4–6 weeks. If containers for the fermented forage (silos) are available for a forage demand needed during a period of about 6 weeks, it will be necessary to carry out a mixing operation approximately only nine times a year while the conventional mixing operation had to be carried out some thousand times a year. The mixing operation is not carried out manually with small amounts but by machines and with great amounts whereby the mixing operation may be carried out much more homogeneously.

In addition, tests have shown that a raw forage mixed with water by machines prior to being filled in the trough even if not fermented is accepted and evaluated by the pigs better than a forage that has been mixed only on the trough. It must be assumed that it is not only the insufficient mixture that produces a low evaluation but that the animals which are taking some dry forage right at the beginning according to the previously usual method of mixing in the trough, also use so much saliva (ptyalin) in so doing that the amount of forage that is taken later on cannot also be soaked with saliva well enough.

Preferably, the forage pulp is metered in dependence upon the delivery time of a pump delivering the forage pulp. Other metering methods are, however, as well possible. In this connection, the term "pump" is to be understood to have a general meaning. This includes not only centrifugal pumps and piston type pumps but especially also screw pumps and the so-called Mohno pumps which consist of a pipe with double-thread worm and the rotor formed as a single-thread worm screw.

In accordance with the invention, an apparatus to carry out the new method is characterized in that at least one liquid-tight container is arranged on a vehicle chassis and is provided with a motor driven mixer and an exit opening of the mixing container is connected over a shut-off device to a pump adapted to be driven by a motor, said pump being reversible in its direction of discharge in such a manner that this exit opening may be selectively positioned at the suction or pressure side of the pump. During the mixing operation, the components of the mixture are circulated within the mixing container. When the mixture has been completed, the pump under certain circumstances with the aid of a conveyor worm of the mixer, will convey the mixture that has been readily mixed for the ensilaging process into the silo container, while on completion of the fermentation, the pump will suck the readily ensilaged strong forage mixture back from the silo container into the mixing container which will then be transported to the stable.

Here, the strong forage mixture will be distributed in metered rations onto the individual troughs with the aid of a hose.

In this operation, an empty silo may be filled from below, a partially filled silo may be filled from above.

The movable mixing apparatus may thus be used for both the ensilaging of juicy forage and the ensilaging of dry forage. A difference results only from the fact that the comminution of the dry forage may be effected in the usual manner and with little aid from machines (rough-grindmill), while the comminution of the juicy forage calls for the employment of more machines.

The composition of the forage changes in dependence of the age of the animals. For a fattening period of a pig, for instance, four different forage compositions are recommendable. However, in order to make the movable apparatus to carry out the invention not too bulky and difficult to handle, it may be recommendable to restrict the movable apparatus to one mixing chamber or two mixing chambers.

The use of this apparatus not only for the mixing of the components of the forage mixture still to be ensilaged but also for the transport and the distribution of the readily ensilaged forage mixture onto the individual troughs brings about the additional advantage that the readily ensilaged forage mixture may be homogenized once more prior to being distributed onto the individual troughs.

An additional advantage of the invention resides in that the time required to mix the forage mixture, i.e. to fill the silo container, may be selected to be another than the time of feeding the animals.

Besides, the size of the mixing chambers and the number of mixing chambers to be placed on one vehicle are also dependent on the size of the respective silo container available and the special conditions of the farm. In case the vehicle is provided with several mixing chambers, it is recommendable to provide mixing containers of different sizes in dependence of the age of the animals which are to be fed with the forage mixtures of different compositions.

The mixing and forage vehicle possesses preferably at least one conveying worm and one mixing worm cooperating in one chamber. The worms are arranged in pairs, one on top of the other and in case several mixing chambers are provided, they may be separated from the adjacent pairs of worms by means of removable partition walls.

The conveying worms disposed at the bottom are discharging into a pump which is designed in such a manner that also materials rich in raw fibres cannot clog. With the aid of the pump, the material is pressed into a trough via a hose.

The mixing container which is preferably subdivided several times, for instance four times, is provided correspondingly with several, for instance four, connections to the pump. It is thus possible to mix different types of forage with the mixing apparatus; pump them into silo containers; take the forage mixtures from the silo containers after fermentation and pump the mixtures into various troughs as required. The running time of the pump is controlled via an electric time relay in order to regulate the discharge volumes. Thus the farmer, having measured the volume of discharge of the pump per unit time will be in a position to fix the respective volume to be fed via the pumping time.

With the aid of the movable hose which is connected to the pump, the farmer may uniformly distribute the forage in the trough during the time the pump is discharging.

If several containers are employed, they are preferably of different sizes because it has been experienced that the farmer mostly subdivides the feeding process several times, in the extreme case four times, for instance when fattening pigs on corn. The four different forage mixtures when corn fattening pigs, are for instance characterized by different relationships between the overall nourishing substance and the albumen and by various contents of effective substances. As small animals eat the smallest amounts, the container for the piglets is selected to be of smallest size. The sizes of the four containers are exactly adapted in their relationships to the development of the forage consumption of the pigs from one group to another. The number of forage containers may be diminished by the removal of the partition walls and the aggregate be used also for the production of mixtures for the purpose of preparing ensilaged forage. For this purpose, the aggregate is designed in such a manner that also mixtures of green forage and strong forage or green forage and potatoes and turnips may be mixed if said forage materials have been comminuted before, and may be rationed and issued by the pump.

The exactness of the rationing is $\pm 0.1\%$. Thus, when using the pump, a greater degree of accuracy is obtained in the proportioning operation than would be possible when weighing.

The losses in handling when discharging the forage by means of the pump in the maner as described are only between 0 and 0.5%. The pump is provided with a reversible motor or a reversing gear, respectively, and may suck and press in both directions. If the mixing apparatus is used for the preparation of fermented forage, the forage may be pressed into a silo. At a latter time, when the fermented forage is to be fed, the forage may be sucked again from the silo with the motor running in the reverse direction.

The importance of the apparatus of the invention is to be seen in the following advantages:

(1) There is no farmer who could ration the forage even for only 20 pigs in the correct manner if he does not use scales, a bucket, etc. and works out a special feeding list. Thus, with the usual way of feeding, the domestic animals get too little or too much food. It has been proved that both are causing considerable economical drawbacks. In this connection, the underfeeding is having just as bad an influence on the performance of the animals as the overfeeding. By the feeding truck designed in accordance with the invention, the farmer is enabled, as described above, to effect an exact allotment of the forage in a simple manner.

(2) With the aid of the subject matter of the invention, it is possible to carry out the feeding operation in about one sixth of the time required with conventional feeding methods.

(3) The waste of food is reduced to a minimum of 0 to 0.5%. The pumping time and thus the amount of food discharged is indicated exactly by a clock which can be arranged on the feeding truck. If corrections become necessary with respect to the amount of food on the basis of a close observation of the animals, such corrections may be easily and safely effected through an adjustment of the clock.

Figure 7:
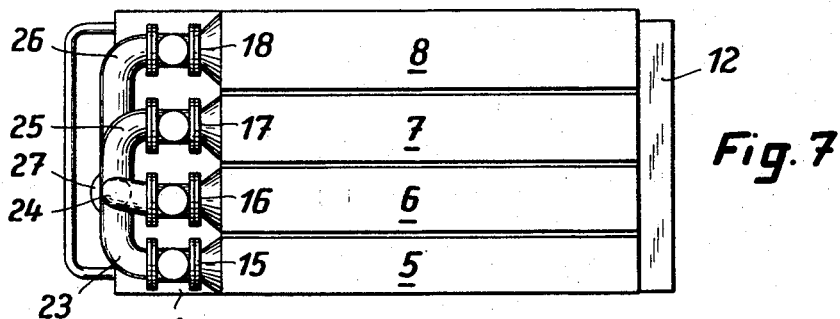
Figure 8:
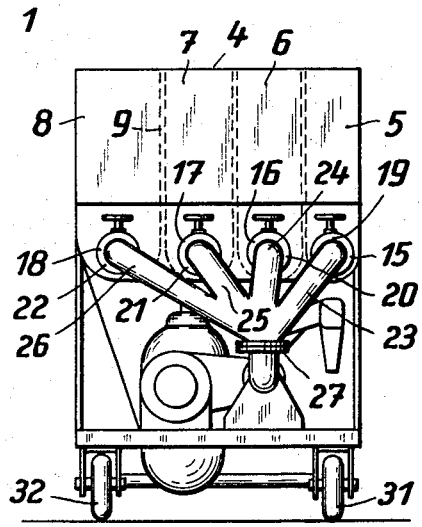
Figure 9:
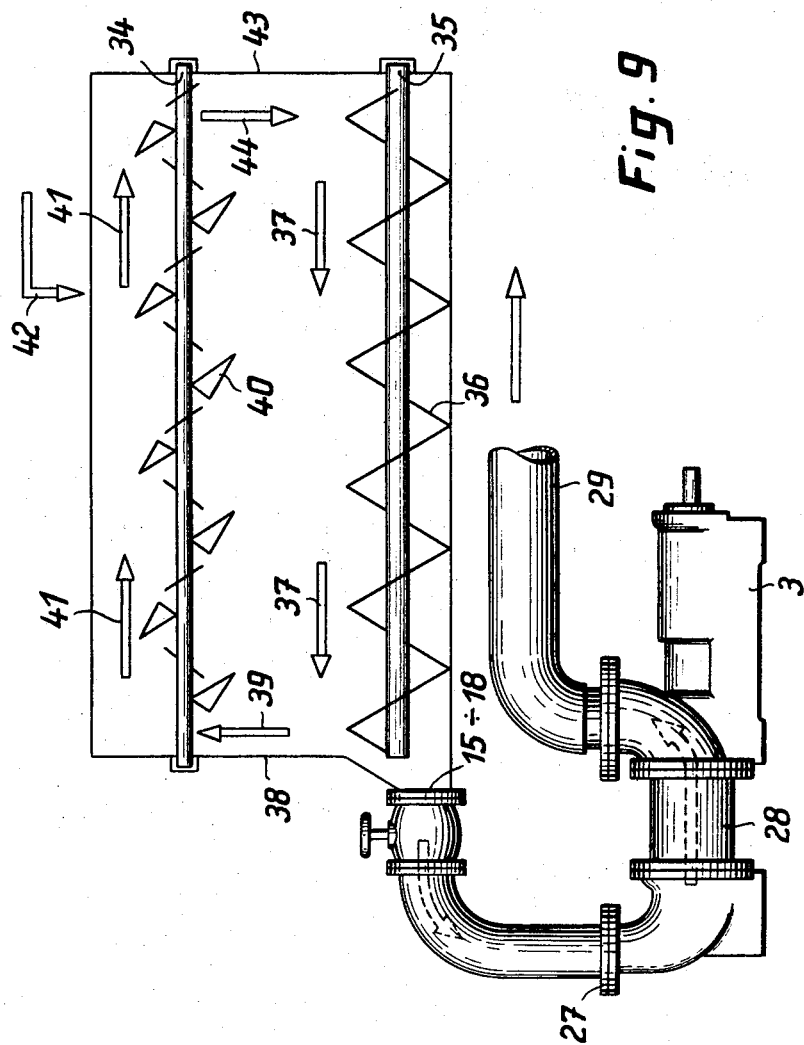
Figure 16:
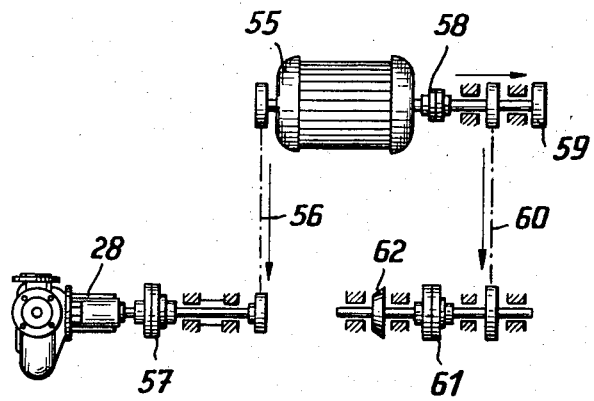
Figure 17:
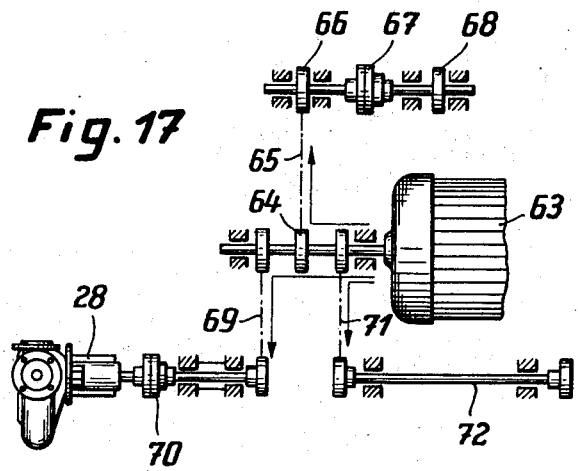

Further improvements and suitable developments of the subject matter of the invention will now be described with the aid of the atached drawings. In the drawings, FIG. 1 shows a perspective view of a truck designed in accordance with the invention and comprising two mixing containers, FIG. 2 is a perspective view of a single mixing container formed in accordance with the invention which at the same time serves to illustrate one stage of the method, FIG. 3 shows a schematical view similar to that of FIG. 2 to illustrate another stage of the method, FIG. 4 is a schematical view similar to that of FIG. 2 to illustrate a further stage of the method, FIG. 5 shows a diagrammatic view similar to that of FIG. 2 to illustrate still another stage of the method, FIG. 6 shows a side view taken of another feeding truck made in accordance with the invention, FIG. 7 is a top plan view taken of the feeding truck shown in FIG. 6, FIG. 8 shows a front view taken of the feeding truck shown in FIGS. 6–7, FIG. 9 shows a side schematic view of a portion of the feeding truck on an enlarged scale, FIGS. 10–15 are perspective views taken of a rotary slide valve in various operational positions which may be selectively used to practise the invention, FIG. 16 shows a diagrammatic view to illustrate the manner in which both the truck itself and the pump and the worms may be driven from an electric motor, and FIG. 17 shows a representation similar to that of FIG. 16 in which, however, an internal combustion engine in the form of a built-in motor is used as common driving engine.

The embodiment in accordance with FIG. 1 shows a vehicle designed in accordance with the invention comprising two mixing containers 73, 74, the one 73 of which is designed slightly greater than the mixing container 74. Both mixing containers are separated by means of a partition wall 75 that may be removed, and are arranged in a common housing 76, which is disposed on a chassis 77.

Each mixing container 73, 74 has arranged therein one disposed above the other a transport or conveying worm 78 (please see FIG. 2) and a mixing or paddling worm 79 which both are driven by means of a motor, especially an electric motor 81, through a gearing, for instance a sprocket gearing 80. The conveying worm 78 discharges at its one end into a pump 84 driven by a motor, especially an electric motor 83, said discharge being effected via a shut-off device 82 which is not shown in more detail. A hose 86 is connected to the pressure connection 85 of the pump. The pump may be reversed in a manner which is not shown in more detail, in which especially the electric motor 83 is reversible or a reversible gearing is provided between the electric motor 83 and the pump 84.

The rear axle 87 of the two rear wheels 88 of the vehicle is rigid. The front wheels 89 are individually suspended from bearing blocks 90 which may under certain circumstances be arranged to be pivotable about a vertical axis.

In the embodiment shown by way of example the truck is moved by hand by means of a bracket 91, with the electric motor 81 being provided only to drive the mixing and conveying worms and the electric motor 83 being provided only to drive the pump. Such an arrangement has proven to be especially good in practical use. In the event, that there are several mixing chambers provided, the discharge side of the conveying worm of each individual mixing chamber is provided with a shut-off device communicating with the pump 84 each through a conduit 92, 93.

The mode of operation is explained in more detail in FIGS. 2–5, in which for the sake of simplicity only one single chamber is shown. It is however, emphasized that under certain circumstances the invention may also be carried out with the arrangement of only one mixing chamber on the vehicle.

In the description of the individual stages of the process, it is assumed that the device is intended for processing water and dry forage.

In accordance with FIG. 2, water and dry forage are filled into the mixing container or the mixing containers in the direction of the arrow 93'. The motor 81 is started with the mixing operation now being carried out only with the aid of the pair of worms 78, 79. The mixture is pumped in the mixing chamber in the direction of the arrows 94 of FIG. 2.

If the mixing operation is to be carried out more intensely, the electric motor 83 may additionally be started while also opening the shut-off device 82. Now, both motors 81, 83 are in operation, please see FIG. 3. A portion of the mixture is sucked from the container by means of the pump 84 through the hose 86, please see the arrow 95, and is pressed back into the container.

In accordance with FIG. 4, the shut-off device 82 is again open. But now, the hose 86 is connected to the connection 96 of a silo container 97. Both motors 81, 83 are in operation. In this manner the entire content of the mixing container is extremely quickly pressed into the silo container. It is also possible to fill the forage mixture into the silo container 97 from above.

98 designates another hose in dotted lines which serves to fill the readily ensilaged forage mixture into the troughs from the mixing container 98', please see FIG. 4.

In accordance with FIG. 5, after the direction of discharge of the pump 84 has been reversed, the readily ensilaged fermented forage is sucked from the silo container 97 via the connection 96, it is also possible to provide another sucking connection at the silo container, and is pressed into the mixing container through the conduit 93 with the shut-off device 82 open. During this operation, only the pump motor 83 is running.

The forage truck shown in FIGS. 6–9 comprises a platform 1, on which, on the one hand, an internal combustion engine 2 and, on the other hand, an electric motor 3 are arranged. A large container 4 is disposed above these two engines which is subdivided into four individual chambers 5, 6, 7, 8. For this subdivision, partition walls 9 are employed which may be removed. Thus, after removal of these partition walls, the large container 4 encases one single space.

The individual chambers 5, 6, 7, 8 are progressively different in size. The chamber 5 is the smallest one and serves especially to prepare food for piglets, while the chamber 8 having the largest dimension is serving the prepared food for larger animals.

The internal combustion engine 2 serves to drive the rear axle 10 of the vehicle on which the drive wheels 11 are fastened. In addition, in the embodiment shown by way of example, the said internal combustion engine may drive the transport and conveying worms via a gearing 12 not shown in detail, said transport and conveying worms being arranged in the individual chambers 5, 6, 7, 8 of the large container 4 in a manner which will be described and shown in more detail below. The coupling 14 of this internal combustion engine may be actuated by means of a lever 13.

The individual chambers 5, 6, 7, 8 have discharge openings 15, 16, 17, 18 which may be closed by shut-off devices, especially shut-off slides 19, 20, 21, 22. From said shut-off devices, separate lines 23, 24, 25, 26 extend to the sucking connection 27 of a pump 28 which is driven by the electric motor 3. The pump is an axially discharging rotary screw type pump, the direction of discharge of which may be reversed by reversing the direction of rotation. For instance, provision has been made for the electric motor 3 to be reversible for this purpose. The pump 28 discharges via a hose 29 to a nozzle 30 from which the individual forage consumption places may be delivered. The nozzle itself may be remotely actuated in a manner which is not shown in more detail, in particular electrically.

The vehicle is steered by the two steering rolls 31, 32 by means of a tube bracket 33. The platform 1 may be provided with only one supporting wheel arranged on the center line of the vehicle on the side of the tubular bracket, said supporting wheel being pivotable also about a vertical axis in addition to being pivotable about a horizontal axis. In this manner, the smallest steering circle of the vehicle is obtained.

In FIG. 9 the inside of one of the chambers 5, 6, 7, 8 is shown in more detail. In each one of these chambers, two shafts 34, 35 are arranged one above the other. These shafts are driven in some manner, in the embodiment shown by way of example this drive is effected from the internal combustion engine 2. The shaft 35 disposed lowermost carries a transport worm 36 and the direction of rotation of said worm and the arrangement of the transport worm are such that the direction of transport of said worm 36 is in the direction of the arrow 37 towards each one of the exit openings 15–18. Naturally, it is possible to have said transport worm extend only partially or provide it with recesses so as to effect also a certain mixing with the aid of said transport worm.

When the shut-off device 15–18 is closed, the material discharged by the transport worm 36 is pressed along the wall 38 in a direction upwardly towards the shaft 34 in the direction of the arrow 39. Said shaft 34 is provided with a plurality of mixing and transport blades 40. These mixing and transport blades have a certain transport effect in the direction of the arrow 41. The transport effect, however, is less than the transport effect of the transport worm 36. The components of the forage mixture to be mixed with each other are introduced into the respective chamber in the direction of the arrow 42. The mixing and transport blades 40 finally discharge the material at the end along the wall 43 in the direction of the arrow 44 downwards to the transport worm 36. Consequently, with the shut-off device 15–18 closed, the material to be mixed is circulated.

Coarse-ground corn and water is filled in for instance from above with the container subdivided into four parts for the purpose of mixing four different components. As already mentioned above, also one single large chamber may be provided by removing the partition walls 9.

When the mixing time has elapsed, the transport worm 36 which, for the sake of simplicity may also be designated as a filling worm to distinguish it from the paddling worm 40, conveys the material to be mixed through the shut-off devices 15–18 which have now been opened, or through one of the shut-off devices, respectively, to the pump 28 which passes the forage mixture further through the hose 29. It is possible with the aid of the pump 28 to suck off each individual forage mixture prepared in one of the chambers 5–8, and transport it further, in which operation then only the one respective shut-off slide may be opened. But it is also possible to provide a large chamber by removal of the partition wall 9 in which case then one unitary greater amount of a certain forage mixture is prepared. After having finished this mixture, all the shut-off slides 15–18 will suitably have to be opened for providing a connection with the pump.

Instead of the individual slides, also one common rotary slide valve may be used in accordance with FIGS. 10–15. This rotary slide valve comprises a cylindrical housing 45 with a slide tube 46 arranged rotatably therein. Said slide tube may be rotated from outside about the axis 52 in a manner not shown in more detail. The housing 45 communicates with the exit openings 15–18 of the individual chambers through supply lines 47, 48, 49, 50. The conduit 51 which is connected to the housing 45, is connected with the sucking connection 27 of the pump 28 in a manner likewise not shown in more detail. The rotary slide 46 has exactly dimensioned perforations or windows 53, 54, of which the windows 53 are disposed in the plane of the individual supply lines 47, 48, 49, 50 while the windows 54 are disposed in the plane of the discharge conduit 51. Besides, the individual windows are arranged in such a manner that with the respective angular positions of the slide tube the respectively desired connections between the individual chambers and the sucking connection of the pump results.

Figure 10:
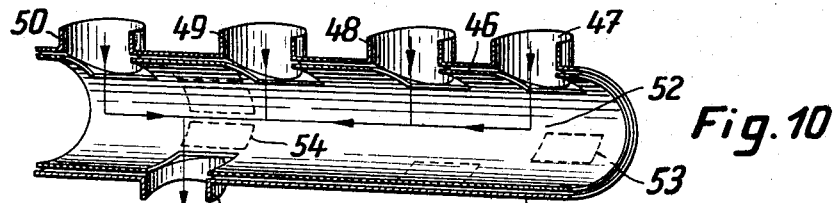
Figure 11:
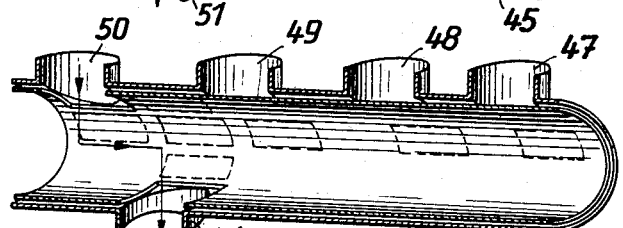

In accordance with the diagrammatic view of the FIG. 10, the entry openings 47, 48, 49, 50 are connected with the discharge opening 51. After having rotated the circular slide 46 by say 30°, the position of FIG. 11 in which the entry 50 is connected with the discharge 51 will be obtained.

Figure 12:
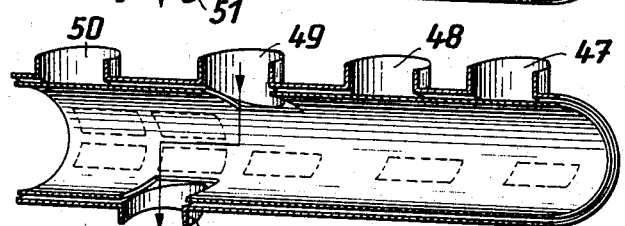

After further rotation by for instance 30°, the position of FIG. 12 will result. In this position, the inlet 49 is connected with the discharge 51 via the inside of the tubular slide 46.

Figure 13:
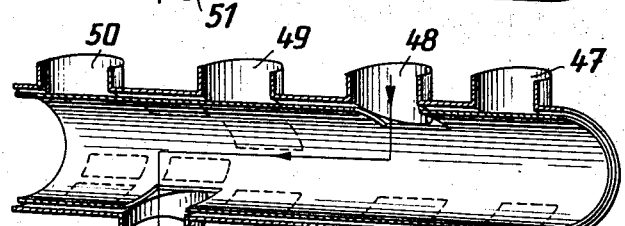
Figure 14:
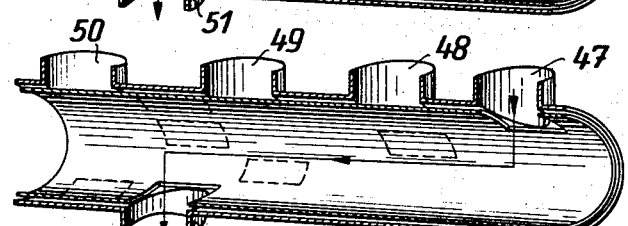

After still another rotation by 30°, the position shown in FIG. 13 will be obtained, in which the inlet 48 is connected with the outlet 51, and, finally, after one more rotation by about 30°, the position of FIG. 14 will be obtained in which the inlet 47 is connected with the outlet 51.

Figure 15:
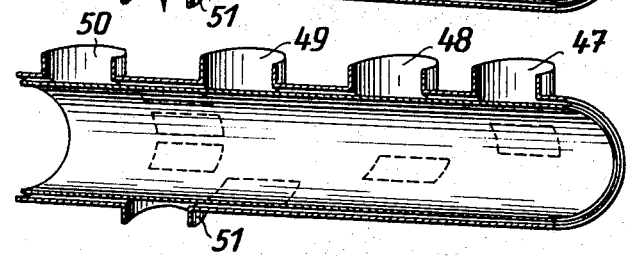

If the slide tube is once more rotated by about 30°, in accordance with FIG. 15, both the inlet openings 47, 48, 49, 50 and the outlet opening 51 are shut off.

The representation of the FIG. 16 shows schematically another possibility of driving the individual machines. Here, one electric motor 55 is provided to drive all the power driven components, said electric motor 55 driving on the one hand the pump 28 via a gearing 56 and a disengaging clutch 57. The gear train may additionally have arranged therein between the electric motor 55 and the pump 28 a reversible gearing in a manner not shown in more detail.

The electric motor additionally drives a shaft 59 via an elastic coupling 58 from which the filling worm shaft 35 and the paddling worm shaft 34 are driven. The shaft 59 additionally drives a bevel gear 62 via a gearing 60 and a disengageable clutch 61 from which the drive of the vehicle is derived.

Also in accordance with FIG. 17, such a common drive may be effected as well from an internal combustion engine 63 which is formed in the manner of a built-in motor. Here, the internal combustion engine 63 drives a shaft 64 which drives another shaft 66 via a gearing 65. This shaft 66 drives a bevel gear 68 through a disengaging clutch 67 from which again the vehicle drive is derived.

The shaft 64 drives on the one hand a disengageable clutch 70 via a gearing 69. Here again, a reversible gearing may additionally be incorporated in a manner not shown in more detail. In addition, the shaft 64 drives on the other hand a shaft 72 via a gearing 71 from which the drive for the filling worm shaft 35 and the paddling worm shaft 34 is derived.

Of course, it is also possible to drive the pump and the mixing device from one single motor, especially one electric motor. This applies especially when the vehicle itself is not driven and when only one or two mixing containers are provided on the vehicle. With the arrangement of only one driving motor it is, however, recommendable to provide a disengageable clutch between the motor and the pump on the one hand and the motor and the mixing device on the other hand.

What I claim is:

1. Apparatus for mixing, transporting and dispensing a forage pulp feed for livestock comprising, in combination, (a) a wheeled vehicle,
   (b) a container mounted upon said vehicle having front, rear and bottom walls, and an opening defined in said front wall adjacent said bottom wall,
(c) a screw type conveyor rotatably mounted in said container extending from said rear wall toward said opening, said conveyor being disposed adjacent to said bottom wall and in substantial axial alignment with said opening and terminating adjacent said opening and said front wall, said conveyor being open throughout its length,
(d) screw type mixing and conveying means mounted in said container extending between said front and rear walls vertically disposed above and substantially parallel to said conveyor,
(e) first power drive means mounted on said vehicle connected to said conveyer and said mixing and conveying means adapted to rotate said conveyer and said mixing and conveying means whereby forage within said container is conveyed by said conveyer toward said opening and said front wall and is conveyed by said mixing and conveying means from said front wall toward said rear wall,
(f) a valve communicating with said container opening controlling the flow of forage through said opening,
(g) a pump mounted on said vehicle having an inlet communicating with said valve and having an outlet,
(h) second power drive means mounted on said vehicle drivingly connected to said pump, and
(i) conduit means communicating with said pump outlet whereby forage may be pumped from said container through said opening and said valve.

2. Apparatus for mixing, transporting and dispensing a forage pulp feed for livestock as in claim 1 wherein:
(a) said first and second power drive means comprise separate electric motors.

3. Apparatus for mixing, transporting and dispensing a forage pulp feed for livestock as in claim 1 wherein:
(a) a motor is mounted upon said vehicle, and
(b) said first and second power drive means comprise transmission means mounted on said vehicle connected to said motor.

4. Apparatus for mixing, transporting and dispensing forage pulp feed for livestock as in claim 1 wherein:
(a) said pump is reversible whereby pulp forage may be pumped through said conduit means into said pump and opening into said container.

5. Apparatus for mixing, transporting and dispensing a forage pulp feed for livestock comprising, in combination,
(a) a wheeled vehicle,
(b) a container mounted upon said vehicle having front, rear and bottom walls, a plurality of partitions within said container extending between said front, rear and bottom walls defining a plurality of separate compartments within said container, and a plurality of openings defined in said front wall adjacent said bottom wall, an opening being defined in each of said compartments,
(c) a screw type conveyer rotatably mounted in each of said compartments extending from the rear wall toward the opening defined in the front wall of the associated compartment, said conveyers being disposed adjacent to the bottom wall of the associated compartment and in substantial axial alignment with the associated opening and the associated compartment front wall, said conveyers being open throughout their length,
(d) screw type mixing and conveying means mounted within each of said compartments extending between the front and rear walls thereof vertically disposed above the conveyor mounted in the associated compartment and substantially parallel thereto,
(e) first power drive means mounted on said vehicle connected to said conveyers and said mixing and conveying means adapted to rotate said conveyers and mixing and conveying means whereby forage within said compartments is conveyed by said conveyers toward the associated opening and the associated front wall, and is conveyed by said mixing and conveying means from the associated front wall toward the associated rear wall.
(f) valve means associated with each of said compartment openings regulating forage flow therethrough,
(g) a pump mounted on said vehicle having an inlet and an outlet,
(h) second power drive means mounted on said vehicle drivingly connected to said pump,
(i) manifold means connecting said pump inlet with said compartment valve means, and
(j) conduit means communicating with said pump outlet whereby forage may be pumped from said compartments through said valve means and manifold means and dispensed through said conduit means 6. Apparatus for mixing, transporting and dispensing a forage pulp feed for livestock as in claim 5,
(a) means removably supporting said partitions within said container whereby partitions may be selectively removed to vary the size of said compartments.

7. Apparatus for mixing, transporting and dispensing a forage pulp feed for livestock as in claim 5 wherein:
(a) said manifold means comprises a rotatable tubular member having a cylindrical wall, and
(b) said valve means includes supply lines communicating with said compartment openings and orifices defined in said tubular member cylindrical wall.

8. Apparatus for mixing, transporting and dispensing a forage pulp feed for livestock as in claim 5 wherein:
(a) said pump is reversible whereby pulp forage feed may be pumped through said conduit means into said pump and openings into said compartments.

References Cited

UNITED STATES PATENTS

| | | | |
|---|---|---|---|
| 47,546 | 5/1865 | Hurd | 222—44.5 X |
| 1,095,383 | 5/1914 | Cole | 222—238 |
| 2,495,671 | 1/1950 | Cellwork | 222—238 X |
| 2,684,785 | 7/1954 | Waldorf et al. | 222—238 X |
| 3,034,543 | 5/1962 | Du Bois | 222—226 X |
| 3,036,737 | 5/1962 | King et al. | 222—227 X |
| 3,093,271 | 6/1963 | Douglas | 222—238 X |
| 3,131,911 | 5/1964 | Geerlings | 222—238 X |

FOREIGN PATENTS 1,075,801 4/1954 France.

SAMUEL F. COLEMAN, *Primary Examiner.*